(12) United States Patent
Chavva et al.

(10) Patent No.: US 11,146,377 B2
(45) Date of Patent: Oct. 12, 2021

(54) METHOD AND APPARATUS FOR COMMUNICATING IN A WIRELESS COMMUNICATION SYSTEM

(71) Applicant: Samsung Electronics Co., Ltd., Gyeonggi-do (KR)

(72) Inventors: Ashok Kumar Reddy Chavva, Bangalore (IN); Anusha Gunturu, Bangalore (IN); Sripada Kadambar, Bangalore (IN)

(73) Assignee: Samung Electronics Co., Ltd

( * ) Notice: Subject to any disclaimer, the term of this patent is extended or adjusted under 35 U.S.C. 154(b) by 98 days.

(21) Appl. No.: 16/323,193

(22) PCT Filed: Aug. 2, 2017

(86) PCT No.: PCT/KR2017/008359
§ 371 (c)(1),
(2) Date: Feb. 4, 2019

(87) PCT Pub. No.: WO2018/026199
PCT Pub. Date: Feb. 8, 2018

(65) Prior Publication Data
US 2019/0165922 A1 May 30, 2019

(30) Foreign Application Priority Data
Aug. 2, 2016 (IN) .............. 201641026407

(51) Int. Cl.
*H04L 5/14* (2006.01)
*H04L 1/18* (2006.01)
(Continued)

(52) U.S. Cl.
CPC .......... *H04L 5/1469* (2013.01); *H04L 1/1812* (2013.01); *H04L 1/1854* (2013.01);
(Continued)

(58) Field of Classification Search
None
See application file for complete search history.

(56) References Cited

U.S. PATENT DOCUMENTS

2012/0327821 A1 12/2012 Lin et al.
2015/0146585 A1 5/2015 Rashid et al.
(Continued)

OTHER PUBLICATIONS

PCT/ISA/210 Search Report issued on PCT/KR2017/008359 (pp. 3).
(Continued)

*Primary Examiner* — Gregory B Sefcheck
*Assistant Examiner* — Amarnauth G Persaud
(74) *Attorney, Agent, or Firm* — The Farrell Law Firm, P.C.

(57) ABSTRACT

The embodiments herein provide methods and systems for implementing time division duplex (TDD) operations in a narrowband internet of things (NB-IoT) to enable cellular IoT operations in user equipment (UE). A method includes receiving TDD uplink-downlink (UL-DL) configuration and transmitting a predetermined number of a symbol group for a random access in one or more UL subframes based on the received TDD UL-DL configuration, each symbol group including a plurality of symbols, wherein at least part of the predetermined number of symbol groups are transmitted discontinuously.

16 Claims, 25 Drawing Sheets

Determine TDD configurations received from an evolved NodeB (eNB) — 202

Enable the NB-IoT TDD operations based on the determined TDD configurations — 204

(51) Int. Cl.
*H04L 5/00* (2006.01)
*H04W 84/04* (2009.01)

(52) U.S. Cl.
CPC .......... *H04L 1/1864* (2013.01); *H04L 5/0053* (2013.01); *H04L 5/0055* (2013.01); *H04W 84/042* (2013.01)

(56) References Cited

U.S. PATENT DOCUMENTS

| | | | | |
|---|---|---|---|---|
| 2016/0081072 A1* | 3/2016 | Zhang | ................... | H04L 5/0055 370/280 |
| 2016/0113037 A1 | 4/2016 | Mizusawa | | |
| 2017/0118747 A1* | 4/2017 | Rico Alvarino | .... | H04W 72/042 |
| 2018/0027581 A1* | 1/2018 | Khoryaev | ............. | H04L 5/0062 370/280 |
| 2018/0049164 A1* | 2/2018 | Wu | ....................... | H04W 72/12 |
| 2018/0145798 A1* | 5/2018 | Suzuki | ................ | H04L 43/0864 |
| 2018/0242284 A1* | 8/2018 | Beale | ..................... | H04L 5/0094 |
| 2018/0254860 A1* | 9/2018 | Wong | ................... | H04L 1/1664 |
| 2019/0140785 A1* | 5/2019 | Li | ......................... | H04L 1/1854 |
| 2019/0165899 A1* | 5/2019 | Gao | ..................... | H04L 1/1816 |
| 2019/0253202 A1* | 8/2019 | Bergstrom | ............ | H04L 1/1621 |
| 2019/0296863 A1* | 9/2019 | Hu | ............................ | H04L 5/14 |
| 2020/0077376 A1* | 3/2020 | Kim | ......................... | H04L 1/08 |

OTHER PUBLICATIONS

PCT/ISA/237 Written Opinion issued on PCT/KR2017/008359 (pp. 7).

ZTE, Issues on NPRACH UL Gap configuration, 3GPP TSG RAN WG1 Meeting #85, R1-165131, Nanjing, China, May 14, 2016, 5 pages.

Pudney, Chris et al., Narrowband IoT, 3GPP TSG RAN meeting #72, RP-160932, Busan, Korea, Jun. 7, 2016, 62 pages.

* cited by examiner

[Fig. 1]
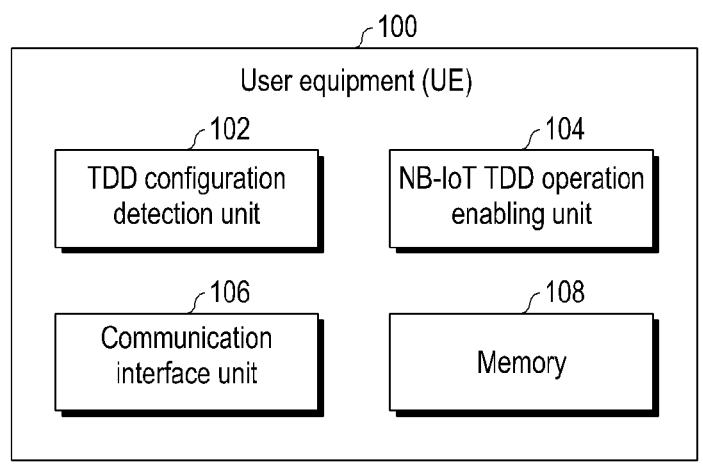
[Fig. 2]
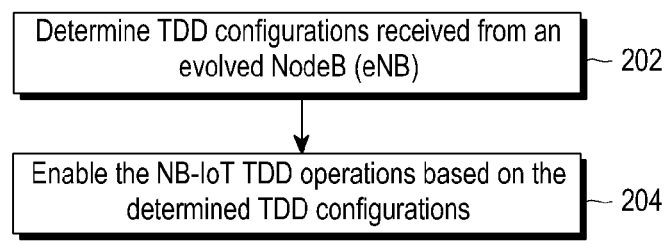

[Fig. 3]
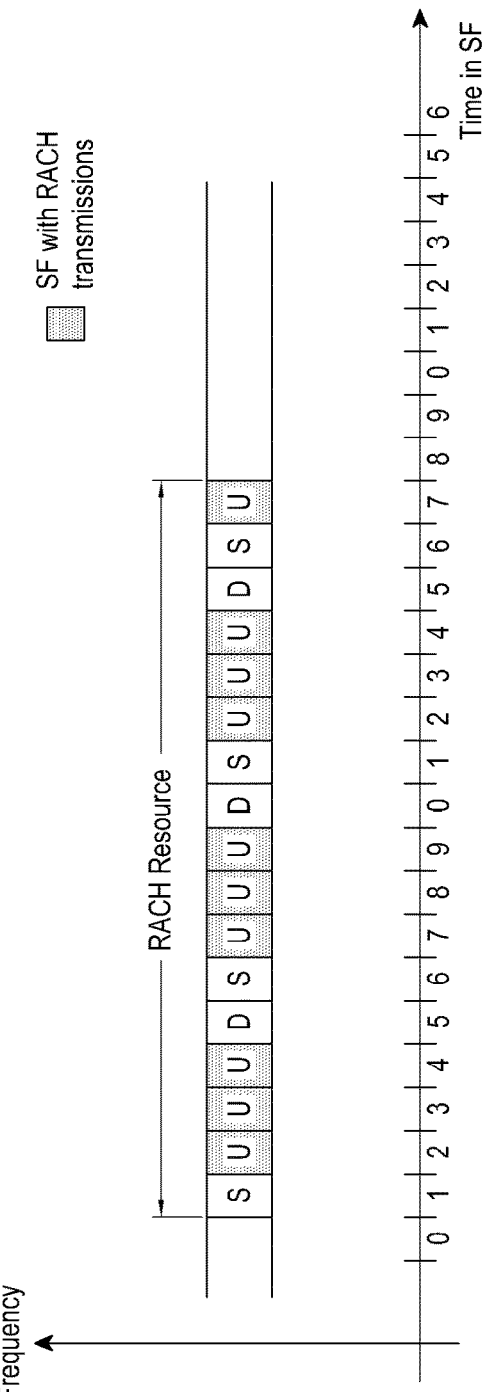
[Fig. 4]
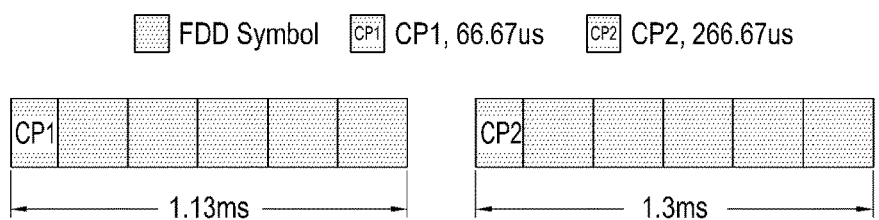

[Fig. 5]
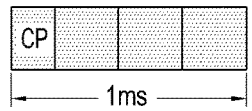
[Fig. 6]
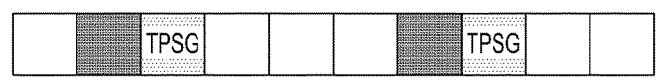
[Fig. 7]
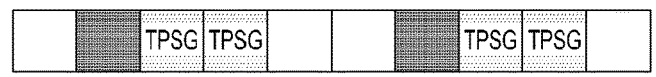
[Fig. 8]
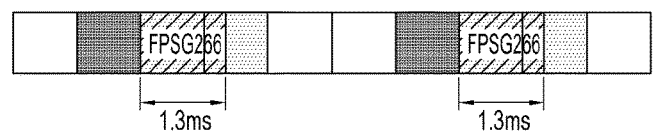
[Fig. 9]
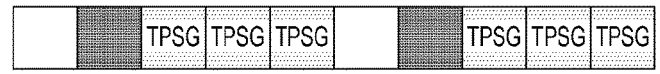
[Fig. 10]
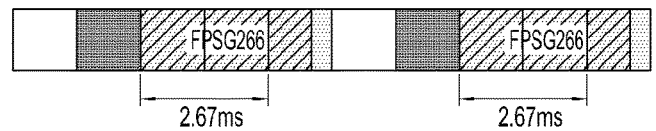

[Fig. 11]
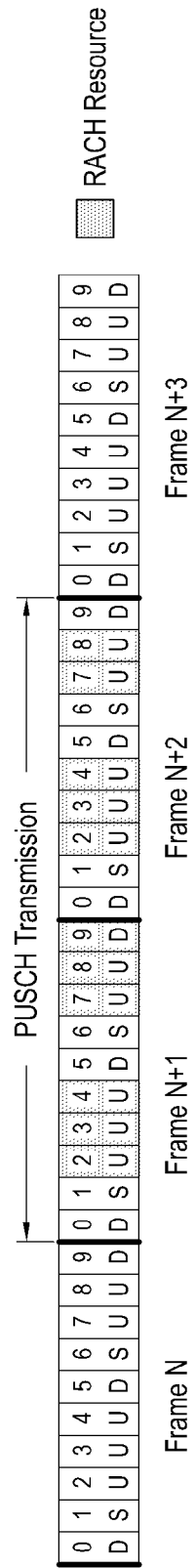

[Fig. 12]
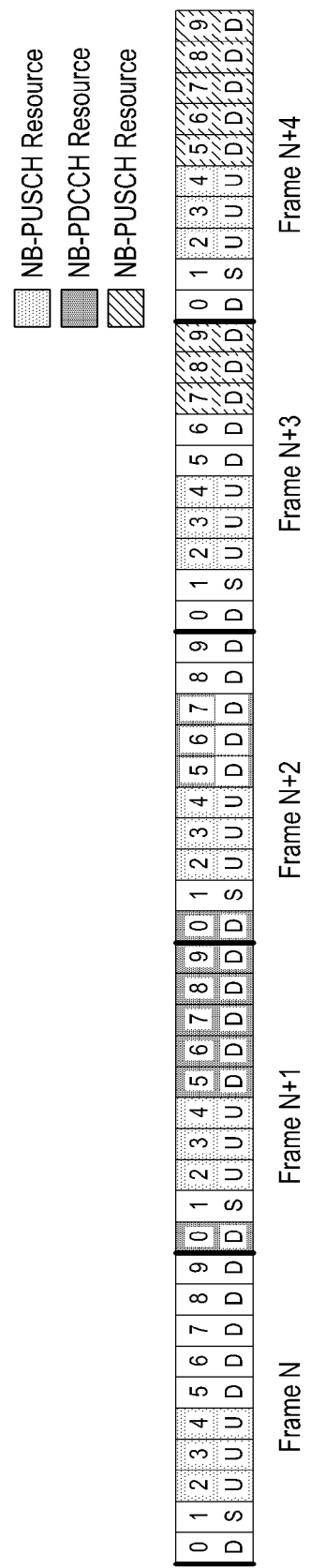

[Fig. 13]
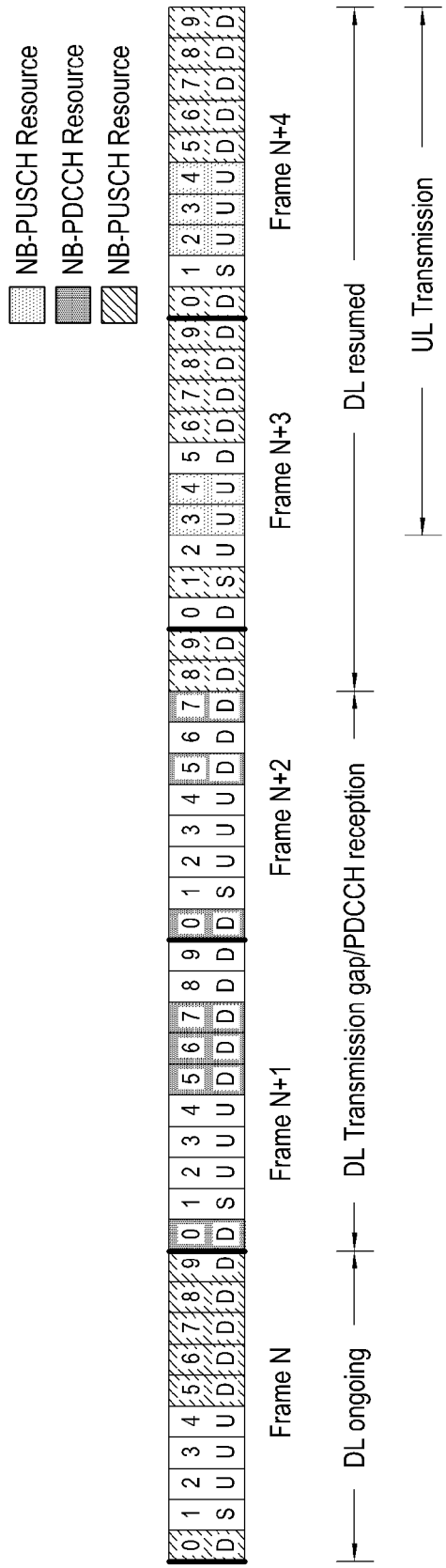

[Fig. 14]
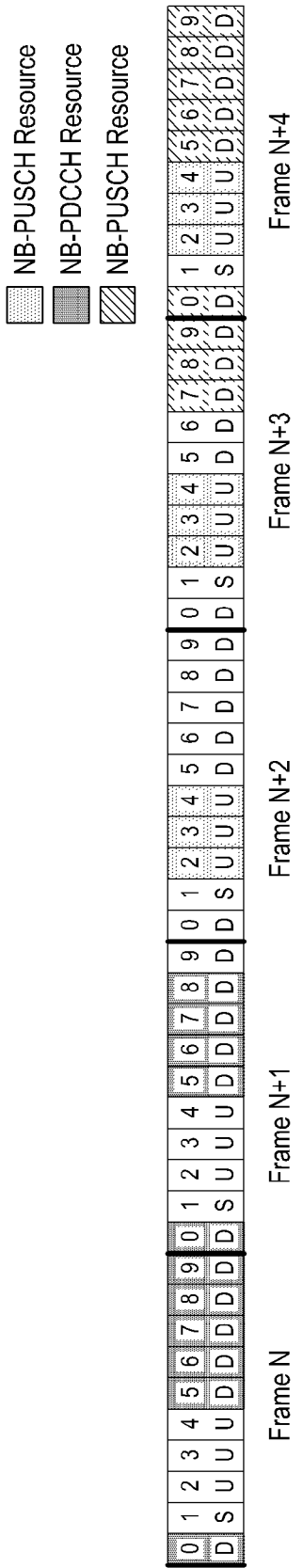

[Fig. 15]

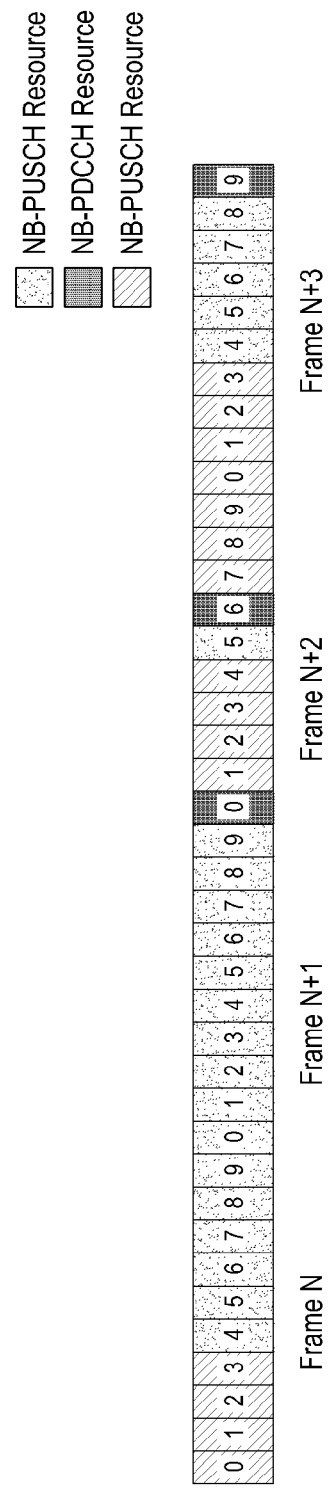
[Fig. 16]

[Fig. 17]
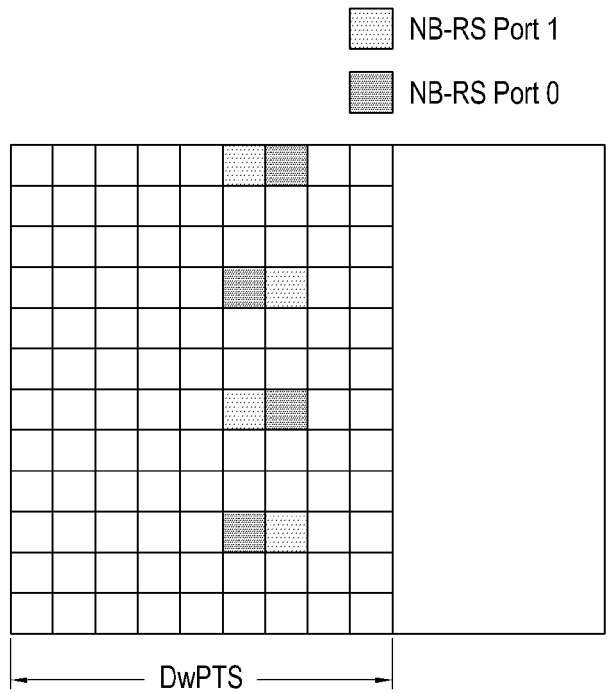
[Fig. 18]
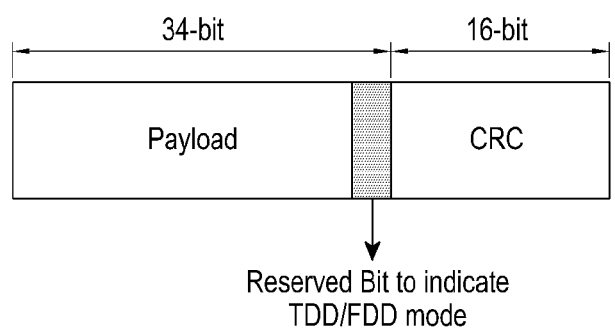

[Fig. 19]
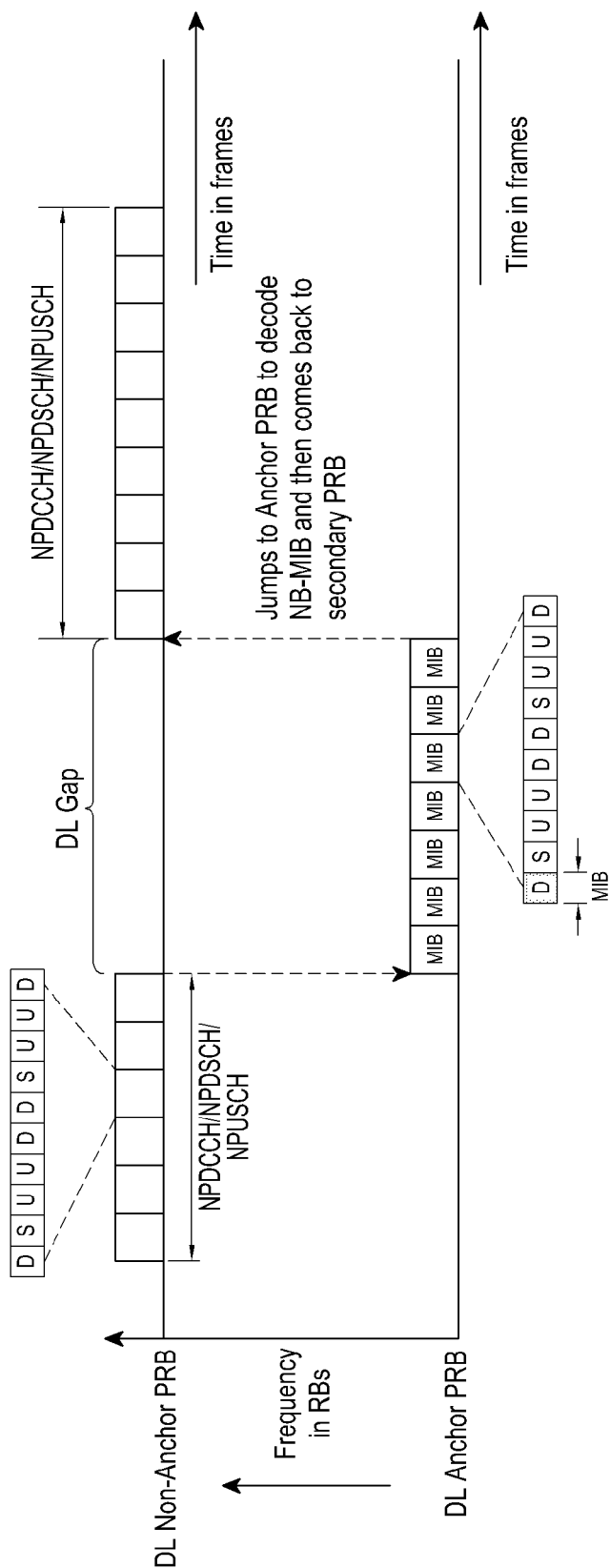

[Fig. 20]
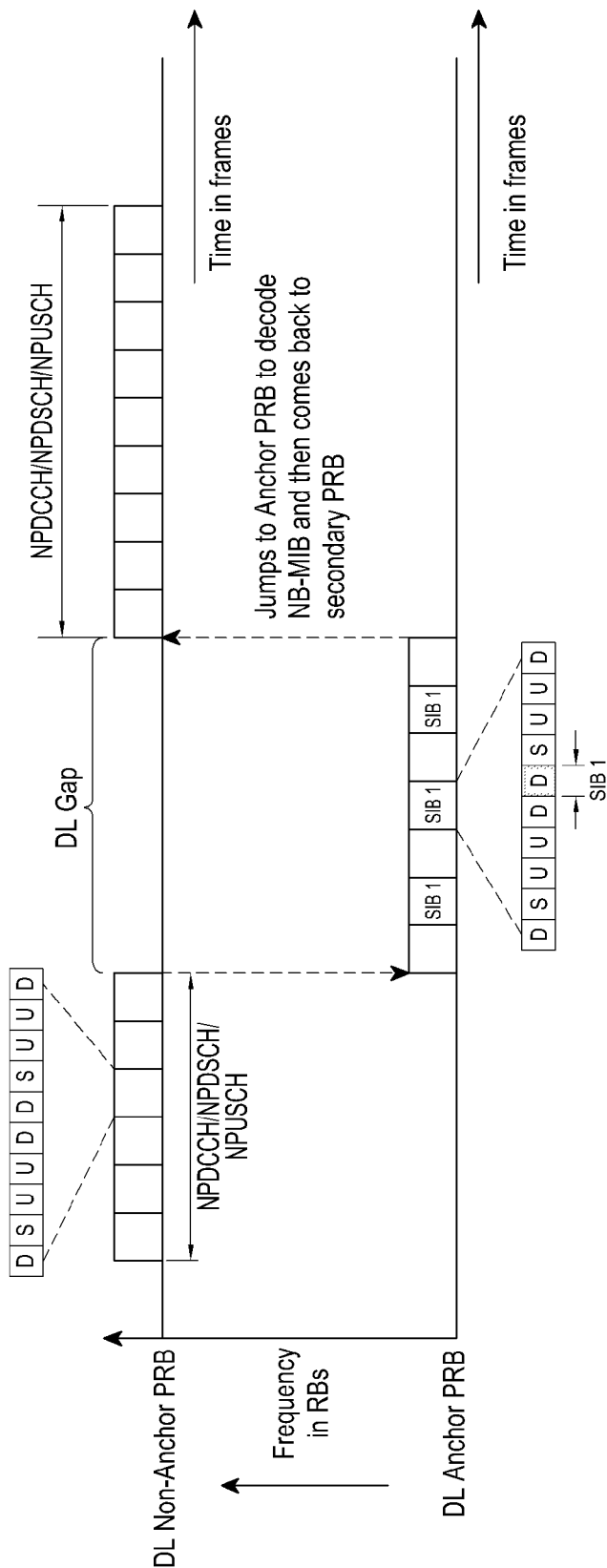

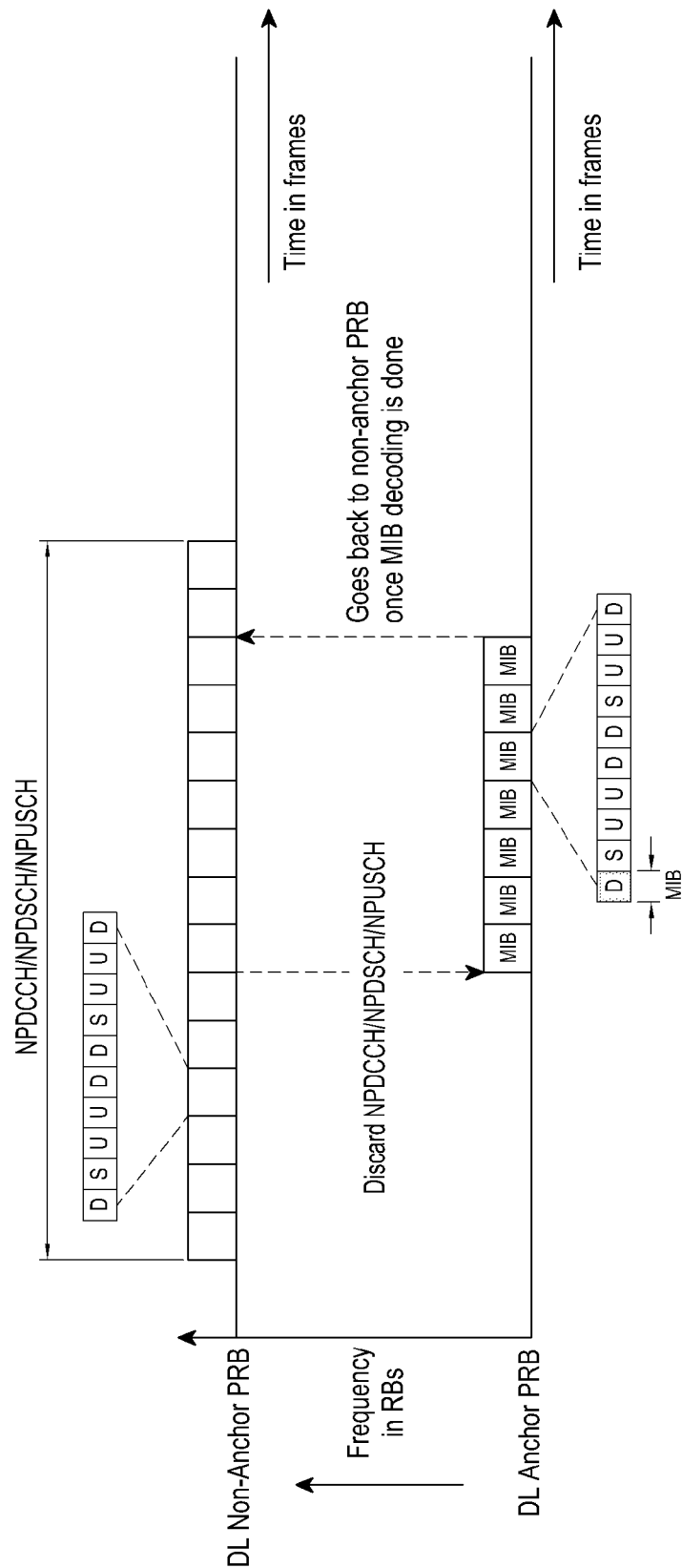
[Fig. 21]

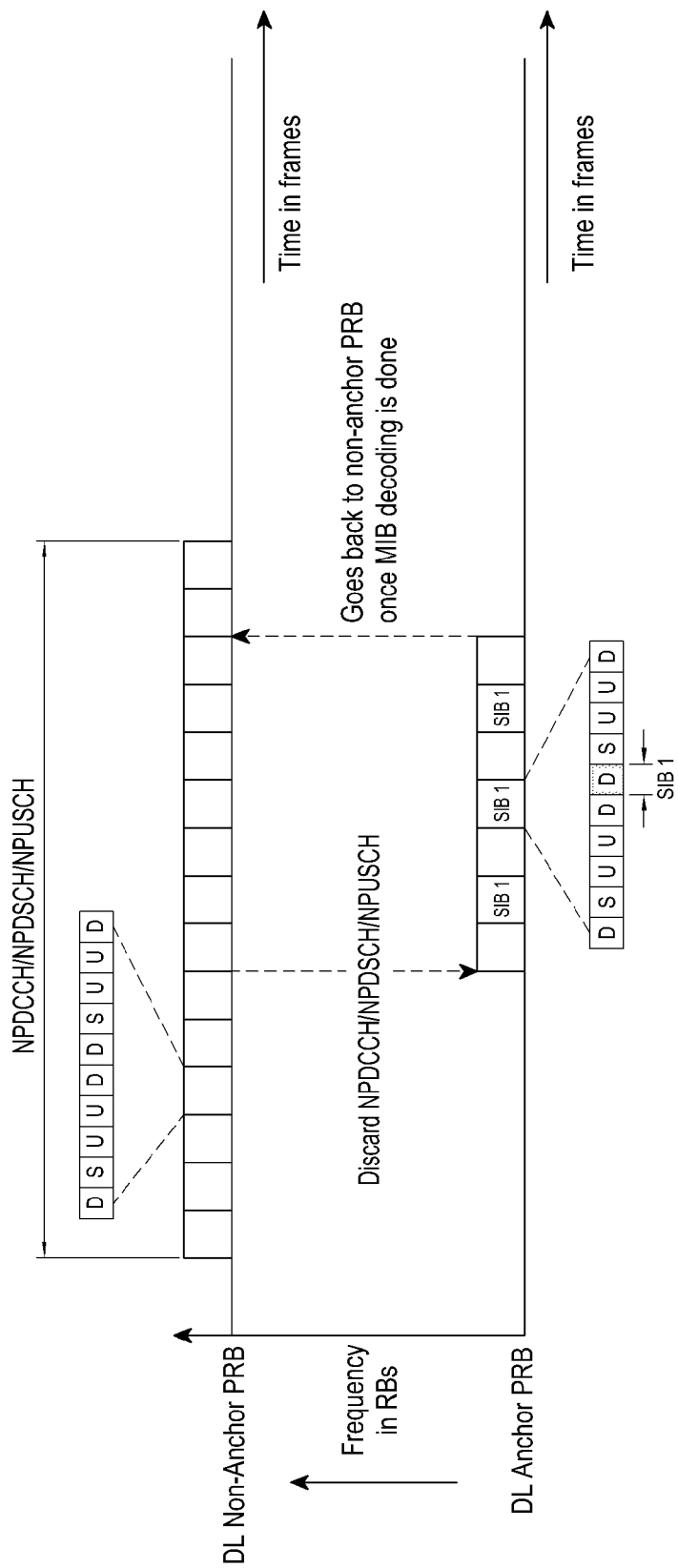
[Fig. 22]

[Fig. 23]
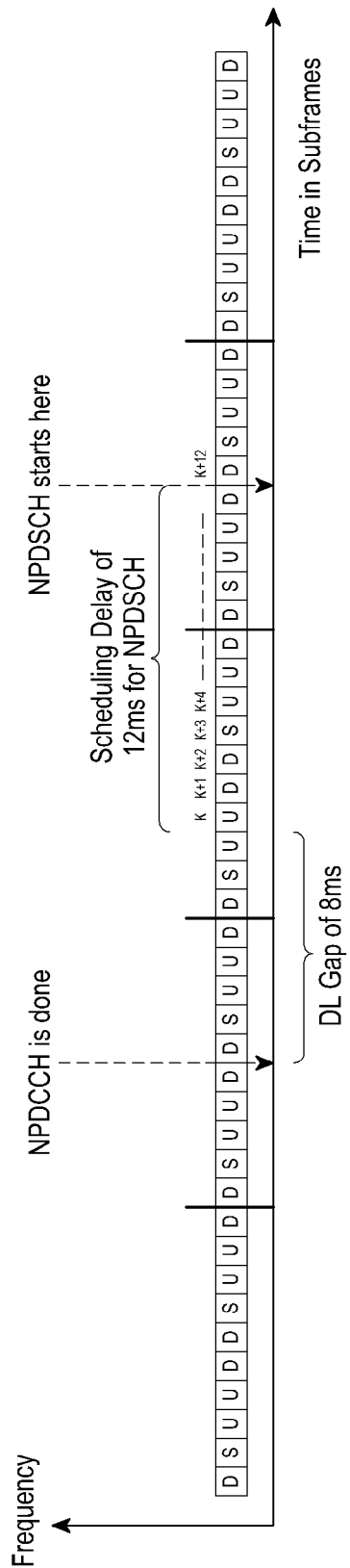

[Fig. 24]
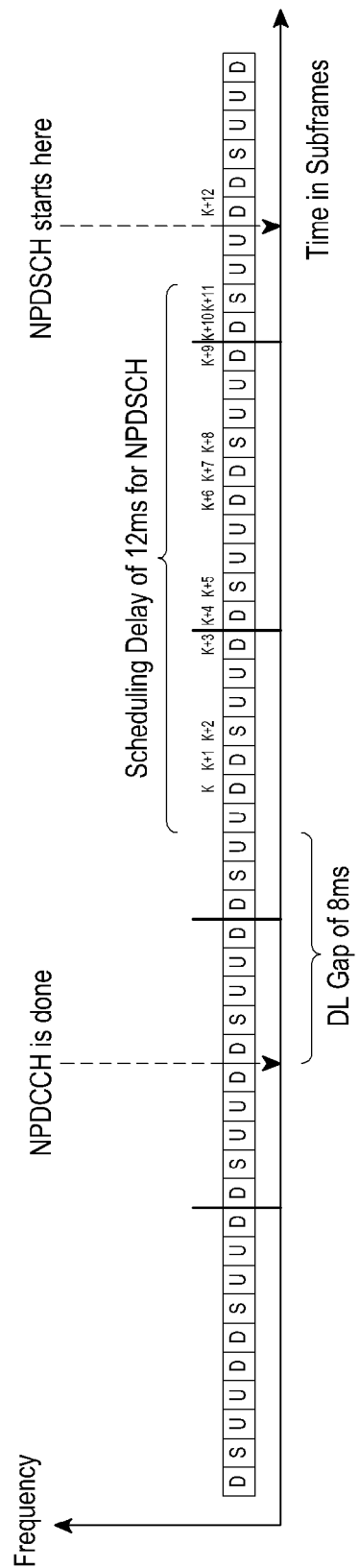

[Fig. 25]
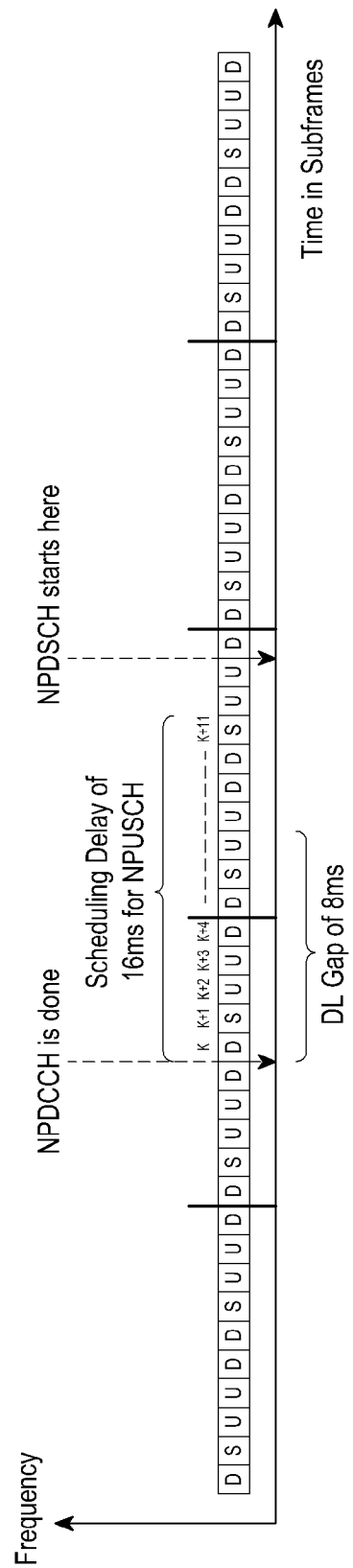

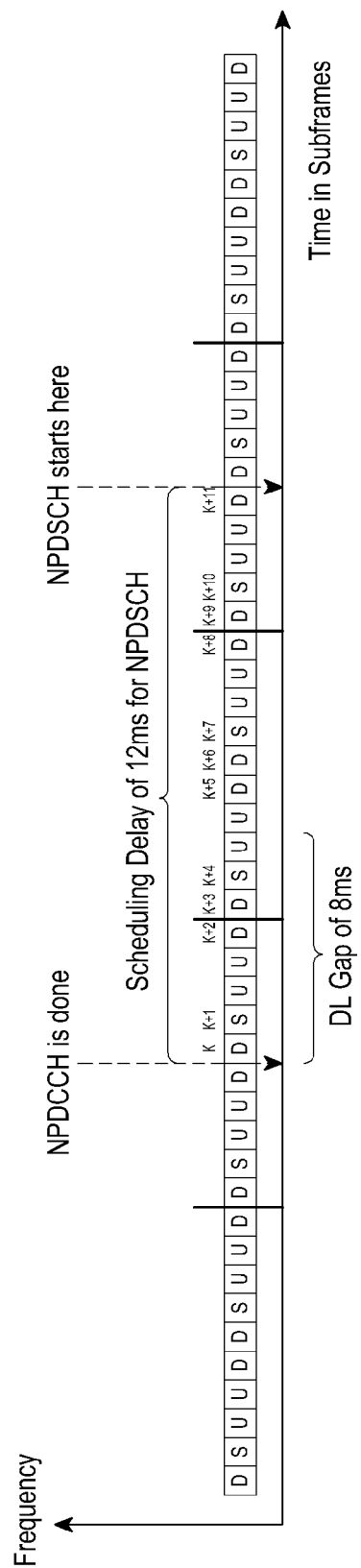
[Fig. 26]

[Fig. 27]
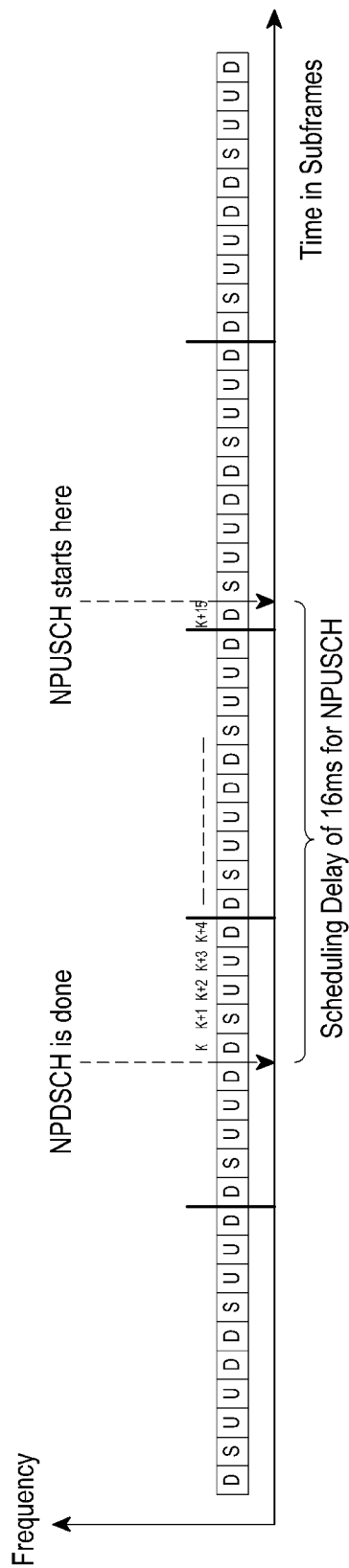

[Fig. 28]
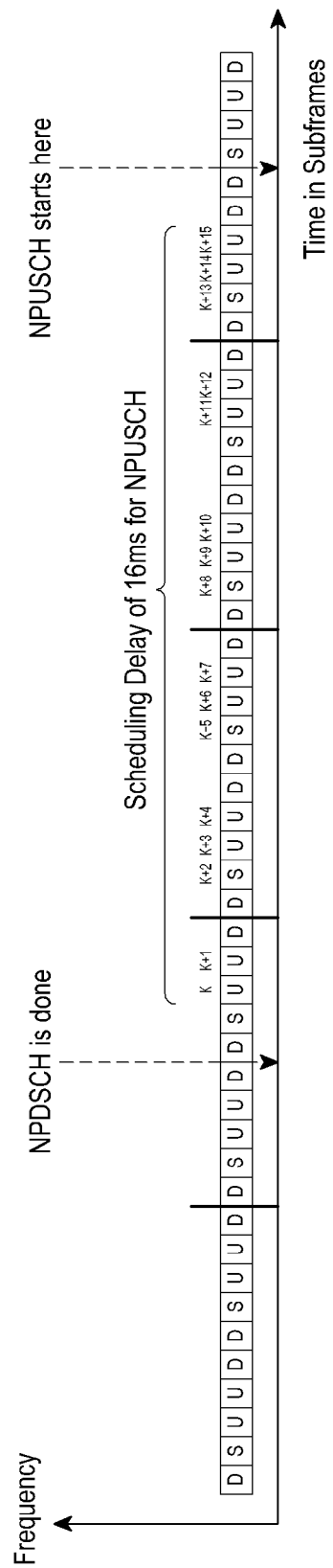

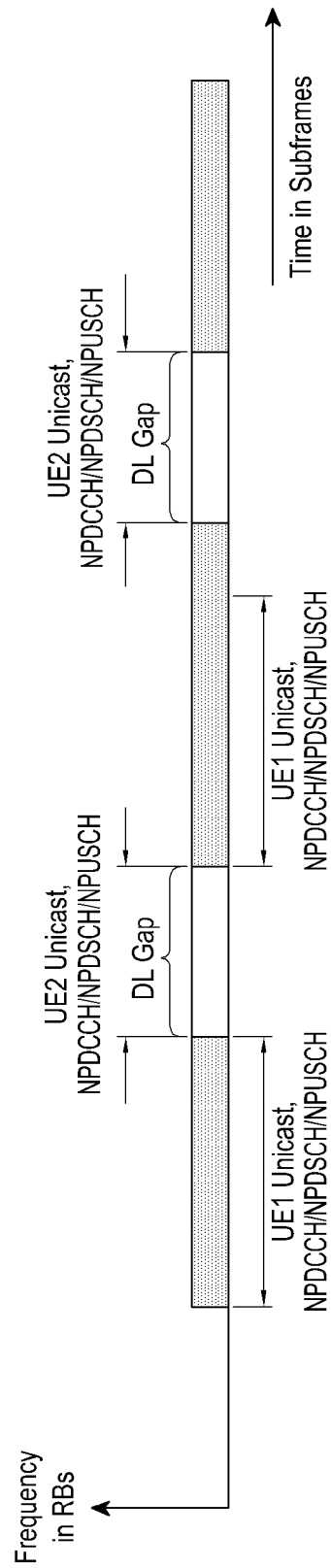
[Fig. 29]

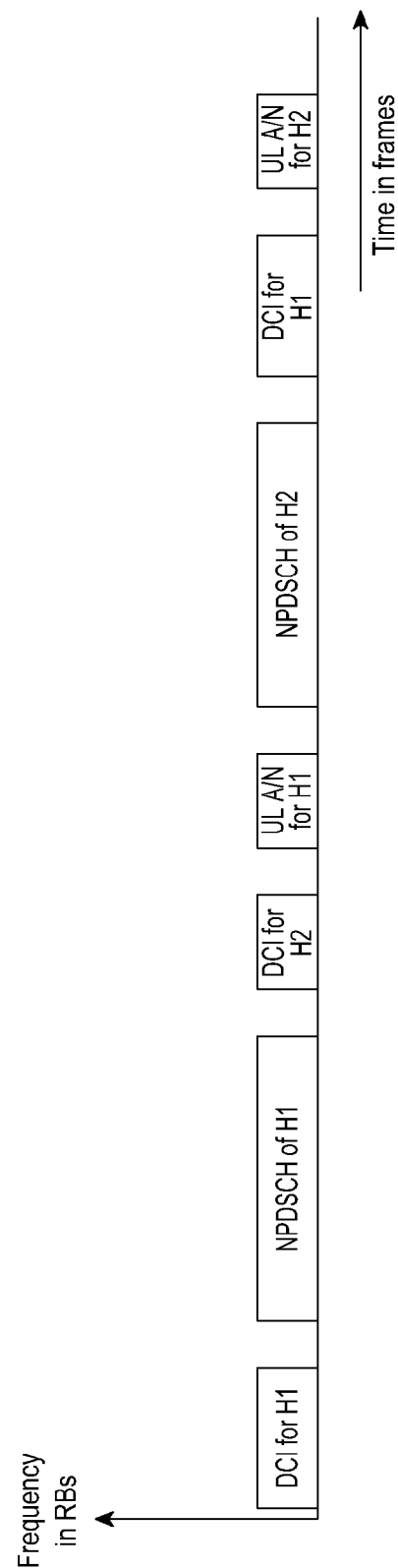
[Fig. 30a]

| LTE | D | S | U | U | U | D | D | D | D | D |

| NB-IoT | D | S | D | D | D | D | D | D | D | D |

[Fig. 31b]
| LTE | D | S | U | U | U | D | S | U | U | D |
| NB-IoT | D | S | D | D | D | D | S | D | D | D |
[Fig. 32]
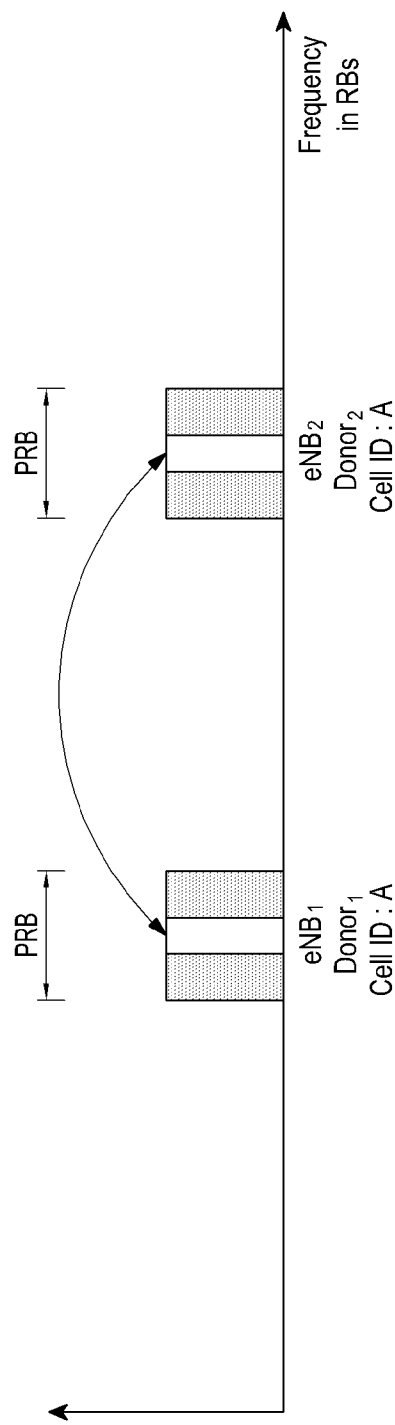

[Fig. 33]
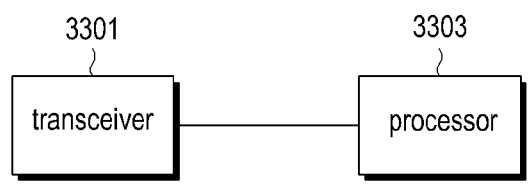

METHOD AND APPARATUS FOR COMMUNICATING IN A WIRELESS COMMUNICATION SYSTEM

PRIORITY

This application is a National Phase Entry of International Application No. PCT/KR2017/008359, which was filed on Aug. 2, 2017, and claims priority to Indian Patent Application Nos. 201641026407 (PS) and 201641026407 (CS), which were filed on Aug. 2, 2016 and Jul. 27, 2017, respectively, the content of each of which are incorporated herein by reference.

1. FIELD

The present invention relates to the field of Internet of Things (IoT) and more particularly to implement narrowband IoT (NB-IoT) using Time Division Duplex (TDD) to enable cellular IoT operations in user equipment.

2. DESCRIPTION OF THE RELATED ART

Narrowband IoT (NB-IoT) enables cellular IoT operations. The 3rd Generation Partnership Project (3GPP) has been actively developing the standard to make cellular IoT feasible. Currently, industry and the 3GPP have been restricted to working on FDD (Frequency Division Duplex) NB-IoT systems. Providing low cost implementation for NB-IoT is one of the design goals of 3GPP.

SUMMARY

Hence, enabling support for NB-IoT TDD will further aid in achieving this target due to lack of duplexer requirement. Further, many countries only support unpaired spectrum where only TDD can be implemented, hence mandates design of NB-IoT TDD to implement the technology for such scenarios.

The principal object of the embodiments herein is to provide methods and systems for implementing narrowband internet of things (NB-IoT) operations using time division duplex (TDD) to enable cellular IoT operations in user equipment (UE).

Another object of the embodiments herein to provide methods and systems for implementing narrowband internet of things (NB-IoT) operations using time division duplex (TDD) to enable cellular IoT operations in user equipment (UE), wherein a method includes determining TDD configurations received from an evolved NodeB (eNB) and enabling the NB-IoT TDD operations based on the determined TDD configurations.

Accordingly the invention provides a method of base station in communicating in a wireless communication system supporting Time Division Duplex (TDD), the method comprising: transmitting, to a user equipment (UE), TDD uplink-downlink (UL-DL) configuration; and receiving, from the UE, a predetermined number of a symbol group for a random access in one or more UL subframes based on the transmitted TDD UL-DL configuration, each symbol group including a plurality of symbols, wherein at least part of the predetermined number of symbol groups are received discontinuously.

Accordingly the invention provides a method of base station in communicating in a wireless communication system supporting Time Division Duplex (TDD), the method comprising: transmitting, to a user equipment (UE), TDD uplink-downlink (UL-DL) configuration; and receiving, from the UE, a predetermined number of a symbol group for a random access in one or more UL subframes based on the transmitted TDD UL-DL configuration, each symbol group including a plurality of symbols, wherein at least part of the predetermined number of symbol groups are received discontinuously.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF THE DRAWINGS

Embodiments herein are illustrated in the accompanying drawings, throughout which like reference letters indicate corresponding parts in the various figures. The embodiments herein will be better understood from the following description with reference to the drawings, in which:

FIG. 1 is a block diagram illustrating various units of a user equipment (UE) for implementing time division duplex (TDD) operations using NB-IoT to enable cellular IoT operations, according to embodiments as disclosed herein;

FIG. 2 is flow diagram illustrating a method for implementing TDD operations in a NB-IoT to enable cellular IoT operations, according to embodiments as disclosed herein;

FIG. 3 illustrates an example of TDD narrowband random access channel (NB-RACH) for TDD uplink/downlink (UL/DL) configuration 0, where the UL subframes are {2,3,4,7,8,9}, according to embodiments as disclosed herein;

FIG. 4 illustrates an example of frequency division duplex (FDD) physical random access channel (PRACH) symbol group structure, according to embodiments as disclosed herein;

FIG. 5 illustrates an example of the TDD PRACH symbol group, according to embodiments as disclosed herein;

FIG. 6 illustrates an example of the PRACH transmission scheme for TDD configuration 2, according to embodiments as disclosed herein;

FIG. 7 illustrates an example of the PRACH using TDD PRACH symbol group (TPSG) for TDD configuration 1, according to embodiments as disclosed herein;

FIG. 8 illustrates an example of a PRACH using FDD266 for TDD configuration 1, according to embodiments as disclosed herein;

FIG. 9 illustrates an example of a PRACH using TPSG for TDD configuration 0, according to embodiments as disclosed herein;

FIG. 10 illustrates an example of a PRACH using FDD PRACH symbol group266 (FPSG266) for TDD configuration 0, according to embodiments as disclosed herein;

FIG. 11 illustrates an example of TDD UL/DL configuration 6, according to embodiments as disclosed herein;

FIG. 12 illustrates an example scenario occurring when simultaneous DL and UL operations are permitted where the UE is required to monitor narrowband physical downlink control channel (NB-PDCCH) for a possible DL allocation even when a narrowband physical uplink shared channel (NB-PUSCH) is in progress, according to embodiments as disclosed herein;

FIG. 13 illustrates an example scenario where the UE receives one or more downlink control information (DCI) in a single PDCCH and is informed of the scheduled NB-PUSCH and narrowband physical downlink shared channel (NB-PDSCH) transmission, according to embodiments as disclosed herein;

FIG. 14 illustrates an example where the UE monitors the NB-PDCCH resource during a NB-PDSCH transmission gap, according to embodiments as disclosed herein;

Figure 15:
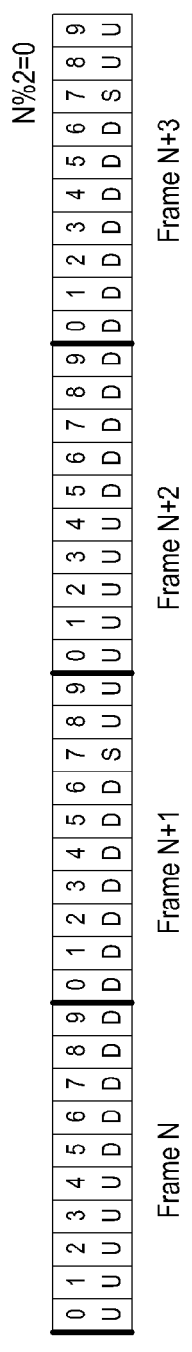

FIG. 15 illustrates an example with switching periodicity of 20 ms where a special subframe (S) for switching between DL-UL occurs in subframe 7 of frame with odd system frame number (SFN), according to embodiments as disclosed herein;

FIG. 16 is an example illustration of TDD DL-UL configuration through a 40 bit length map, according to embodiments as disclosed herein;

FIG. 17 is an example illustration of transmission of narrowband reference signal (NB-RS) in special subframes for special subframe configuration 2 with downlink pilot timeslots (DwPTS) region comprising of 9 symbols, according to embodiments as disclosed herein;

FIG. 18 is an example illustration of reserved bit in narrowband master information block (NB-MIB) indicating TDD/FDD mode, according to embodiments as disclosed herein;

FIG. 19 is an example illustration to decode NB-MIB in case of DL gaps in a non-Anchor physical resource block (PRB), according to embodiments as disclosed herein;

FIG. 20 is an example illustration to decode narrowband system information block 1 (NB-SIB1) in case of DL gaps in a non-Anchor PRB, according to embodiments as disclosed herein;

FIG. 21 is an example illustration to decode NB-MIB by discarding NPDCCH/NPDSCH/NPUSCH in a non-Anchor PRB, according to embodiments as disclosed herein;

FIG. 22 is an example illustration to decode NB-SIB1 by discarding NPDCCH/NPDSCH/NPUSCH in a non-Anchor PRB, according to embodiments as disclosed herein;

FIG. 23 illustrates an example for counting scheduling delay of NPDSCH including UL subframes after a DL gap, according to embodiments as disclosed herein;

FIG. 24 illustrates an example for counting scheduling delay of NPDSCH excluding UL subframes after a DL gap, according to embodiments as disclosed herein;

FIG. 25 illustrates an example for counting scheduling delay of NPDSCH including UL subframes within a DL gap, according to embodiments as disclosed herein;

FIG. 26 illustrates an example for counting scheduling delay of NPDSCH excluding UL subframes within a DL Gap, according to embodiments as disclosed herein;

FIG. 27 illustrates an example for counting scheduling delay of NPUSCH including DL subframes, according to embodiments as disclosed herein;

FIG. 28 illustrates an example for counting scheduling delay of NPUSCH excluding DL subframes, according to embodiments as disclosed herein;

FIG. 29 is an example illustration of continuation of a transmission scheduled in DL gap in an upcoming gap, according to embodiments as disclosed herein;

FIGS. 30a and 30b are examples illustrating two different scenarios where two hybrid automatic repeat request (HARQ) processes are maintained, according to embodiments as disclosed herein;

FIGS. 31a and 31b are examples illustrating assignment of UL subframe to DL subframe in uplink-downlink long term evolution (LTE) TDD configurations 3 and 6 for NB-IoT, according to embodiments as disclosed herein; and FIG. 32 is an example illustrating Multi-PRB operation between two different donor cells, according to embodiments as disclosed herein.

FIG. 33 is a block diagram illustrating various units of a base station according to various embodiments of the present disclosure.

DETAILED DESCRIPTION

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

The embodiments herein achieve methods and systems for implementing time division duplex (TDD) operations in a narrowband Internet of Things (NB-IoT) to enable cellular IoT operations. Referring now to the drawings, and more particularly to FIGS. 1 through 32, where similar reference characters denote corresponding features consistently throughout the figures, there are shown example embodiments.

FIG. 1 is a block diagram illustrating various units of user equipment (UE) 100 for implementing time division duplex (TDD) operations using NB-IoT to enable cellular IoT operations, according to embodiments as disclosed herein.

In an embodiment, the UE 100 can be at least one of but not restricted to a mobile phone, a smartphone, tablet, a phablet, a personal digital assistant (PDA), a laptop, a computer, a wearable computing device, an IoT (Internet of Things) device, a smart TV, wearable device (for example, smart watch, smart band), a dongle, a hotspot device, a vehicle infotainment system, VR (Virtual Reality) devices, headphones, earphones or any other electronic device. The UE 100 includes a TDD configuration detection unit 102, a NB-IoT TDD operation enabling unit 104, at least one communication interface unit 106 and at least one memory 108. The TDD configuration detection unit 102 can be configured to determine TDD configurations received from an evolved NodeB (eNB) (not shown), wherein the TDD configurations is received as a part of narrowband system information block (NB-SIB). The determined TDD configuration enables the UE 100 to differentiate an uplink (UL) and a downlink (DL) sub-frames. Further, the NB-IoT TDD operation enabling unit 104 can be configured to enable the NB-IoT TDD operations based on the determined TDD configurations. In an embodiment, the TDD configurations include a plurality of configurations such as configuration 0, configuration 1, configuration 2, configuration 3, configuration 4, configuration 5, configuration 6 and so on. In an embodiment, the NB-IoT TDD operations include TDD NB-IoT RACH procedure for different legacy systems, TDD configurations, NB-PUSCH transmission with ongoing DL, special subframe configurations, operation of TDD system with uplink (UL) and downlink (DL) gaps, multi-carrier operations and multiple HARQ process or the like.

The communication interface unit 106 can be configured to establish communication between the UE 100 and the eNB. The memory 108 can be configured to store data that is required enable the NB-IoT TDD operations based on the determined TDD configurations. The memory 108 may include one or more computer-readable storage media. The memory 108 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 108 may, in some examples, be considered a non-transitory storage medium. The term "non-transitory" may indicate that the storage medium is not embodied in a carrier wave or a propagated signal. However, the term "non-transitory" should not be interpreted to mean that the memory 108 is non-movable. In some examples, the memory 108 can be configured to store larger amounts of information than the memory. In certain examples, a non-transitory storage medium may store data that can, over time, change (e.g., in Random Access Memory (RAM) or cache).

FIG. 1 shows exemplary units of the UE 100, but it is to be understood that other embodiments are not limited thereon. In other embodiments, the UE 100 may include fewer or greater number of units. Further, the labels or names of the units are used only for illustrative purpose and does not limit the scope of the embodiments herein. One or more units can be combined together to perform same or substantially similar function in the UE 100.

FIG. 2 is flow diagram 200 illustrating a method for implementing TDD operations in the NB-IoT to enable cellular IoT operations, according to embodiments as disclosed herein.

At step 202, the method includes determining the TDD configurations received from the eNB. The method allows the TDD configuration detection unit 102 to determine the TDD configurations received from the eNB. The TDD configurations can be received as a part of narrowband system information block (NB-SIB). The determined TDD configuration enables the UE 100 to differentiate the UL and the DL sub-frames.

At step 204, the method includes enabling the NB-IoT TDD operations based on the determined TDD configurations. The method allows the NB-IoT TDD operation enabling unit 104 to enable the NB-IoT TDD operations based on the determined TDD configurations.

The various actions, acts, blocks, steps, or the like in the method and the flow diagram 200 may be performed in the order presented, in a different order or simultaneously. Further, in some embodiments, some of the actions, acts, blocks, steps, or the like may be omitted, added, modified, skipped, or the like without departing from the scope of the invention.

The NB-IoT TDD operations include TDD NB-IoT RACH procedure for different legacy system TDD configurations, NB-PUSCH transmission with ongoing DL, special subframe configurations, operation of TDD system with uplink (UL) and downlink (DL) gaps, multi-carrier operations and multiple HARQ process or the like. The NB-IoT TDD operations are detailed below.

TDD NB-RACH (Time division duplex Narrowband-Random access channel) Procedures

In an embodiment, due to discontinuous resources in the TDD, narrowband-physical random access channel (NB-PRACH) transmission can only be performed in uplink (UL) subframes. Hence, the contiguous NB-PRACH transmissions can skip the downlink (DL) subframes and can treat the DL subframes as invalid subframes for the NB-PRACH. In order to do skip the DL subframes, the UE may need to know the TDD configuration to differentiate between the UL and the DL subframes. The TDD configuration information can be transmitted in advance as part of a system information block (NB-SIB). In an embodiment, the TDD configuration information can be transmitted as part of NB-IoT SIB1.

Further, the UE can access eNB signals during the RACH process due to the available DL subframes. The available DL subframes can be used to perform time and frequency corrections during the RACH process. In case of frequency division duplex (FDD) NB-IoT devices during NB-PRACH process, the FDD NB-IoT devices may use RACH gaps to maintain synchronization with the eNB. However, in case of TDD NB-IoT device, the RACH gaps (which are used to maintain synchronization with the eNB during NB-PRACH) may no longer necessary due to the availability of eNB signals in the DL subframes during RACH transmission in the UL subframes.

FIG. 3 illustrates a TDD NB-RACH example for TDD UL/DL configuration 0, where the UL subframes are {2, 3, 4, 7, 8, 9}. Hence, other subframes are not used for NB-RACH transmission.

NB-RACH Symbol Group Transmission

For FDD, a RACH sequence can comprise of 4 symbol groups, each symbol group comprising of 5 symbols and a cyclic prefix (CP) as shown in FIG. 4. In an embodiment herein, the CP can be of the duration of 66.67 μs or 256.67 μs. Further, 3.75 kHz subcarrier spacing can be used. Each symbol can be of 128 samples length. Hence, a transmission time for a symbol group is 1.13 ms and 1.33 ms for CP lengths 66.67 μs and 256.67 μs respectively.

However, as per the present TDD configuration definitions, a number of contiguous 15 kHz UL subframes available for RACH resource is 1, 2 or 3 depending on the eNB TDD configuration. Hence depending on the TDD configuration definition, a maximum of 1 ms, 2 ms and 3 ms length NB-IoT RACH resources can be available. In an embodiment, the FDD symbol group definition can be reused for TDD. In an embodiment, a symbol group can be defined for TDD PRACH, which can fit in within 1 ms.

Henceforth, in the descriptions, FDD PRACH symbol group is indicated as FPSG and TDD PRACH symbol group is indicated as TPSG. Further, FPSG66 and FPSG266 can be used to indicate FDD PRACH symbol groups with CP lengths 66.67 μs and 266.67 μs respectively. The following sections disclose embodiments for implementing TDD PRACH using FPSG and TPSG.

TPSG can be defined as shown in FIG. 5 with 3 symbols of length 128, a CP of duration 200 μs and subcarrier spacing of 3.75 kHz. After transmission of a number of TPSG, if the next subframe is configured as DL, the transmission will be paused and it will be resumed when the PRACH resource occurs on the next UL subframe.

TDD UL/DL Configuration 2/5

For the TDD UL/DL configurations 2 and 5, the maximum contiguous UL transmission duration can be 1 ms. Hence using either FPSG66 or FPSG266 is infeasible, as they cannot fit into the duration of 1 ms. Hence, only a TPSG transmission can be performed for an occurrence of an UL RACH resource in the PRACH transmissions. FIG. 6 illustrates transmission of TPSG for PRACH for TDD configuration 2. Therefore, two TPSGs can be transmitted per radio frame. For example, the two TPSGs can be transmitted in subframes 2 and 7 respectively in the FIG. 6.

TDD UL/DL Configuration 1/4

For the TDD UL/DL configuration 1 and 4, a maximum of 2 ms duration can be available for a continuous UL transmission. Hence, two consecutive TPSG transmissions can be performed for every occurrence of a contiguous UL RACH resource. FIG. 7 illustrates the TDD configuration 1 which can have two sets of 2 ms UL durations. Therefore, for the TDD configuration 1, 4 TPSG can be transmitted per radio frame.

Further, the PRACH transmission can also be performed using FPSG266, which is illustrated in FIG. 6. Since, the FPSG266 is of length 1.3 ms, the second UL subframe can be partially used as shown in FIG. 8. In this case, two FPSG266 symbol groups can be transmitted per radio frame.

TDD UL/DL Configuration 0/3/6

In the TDD UL/DL configurations 0, 3 and 6, a contiguous UL resource can be available for a maximum of 3 ms duration. FIG. 9 illustrates the PRACH transmission for TDD configuration 0 using TPSG. The UL RACH resources can be available for 6 ms per radio frame, therefore same number of TPSG can be transmitted in the 6 ms duration.

FIG. 10 shows the PRACH transmission using FPSG266, where the two symbol groups can be transmitted per occurrence of the UL, where two FPSG266 can be transmitted per 3 ms duration of the available UL resources. However, at the end of the 3 ms of the RACH resource (i.e., last 0.33 ms as shown in FIG. 10), there can be no transmission.

TDD NB-PUSCH Procedures

For the TDD operations, the DL subframes can be configured as invalid subframes. Hence, the NB-PUSCH transmissions can be limited to the UL subframes in the radio frame. FIG. 11 shows an example for TDD UL/DL configuration 6. In the example herein, the NB-PUSCH transmission can be scheduled starting at radio frame N+1. The UE 100 may decode the TDD configurations to know the DL-UL configurations, on receiving the narrow band system information messages (NB-SIB). Thus, the UE 100 can recognize that the subframe 0 and 1 of the radio frame are not for the UL transmissions and begins to perform the UL transmissions starting at subframe 2. Further, all intermediate subframes which are not UL can be skipped.

Simultaneous DL and UL Operations

Due to the discontinuous nature of the TDD, transmission of a number of NB-PUSCH repetitions will be of longer duration as compared to the FDD. Hence, allowing the DL reception during the UL transmission and vice versa can be advantageous. Taking this point into consideration the following options will be possible for NB-PUSCH/NB-PDSCH scheduling:

Disjoint DL/UL

After receiving a grant for the narrowband-physical downlink control channel (NB-PDCCH), the UE 100 may not further monitor NB-PDCCH for any of the DL or the UL grant until the start of the scheduled DL or UL transmission.

Simultaneous DL/UL

The UE 100 can tune into DL mode during TDD DL subframes when the UL transmission is ongoing, the NB-IoT UE 100 can be allowed to monitor or receive NB-PDCCH and Narrowband-Physical Downlink Shared Channel (NB-PDSCH) and vice versa. FIGS. 12, 13 and 14 show sample scenarios for TDD configuration 3, when the DL and the UL operations are simultaneously allowed in the NB-IoT TDD.

FIG. 12 depicts a scenario occurring when simultaneous DL and UL operations are permitted where the UE 100 is required to monitor the NB-PDCCH for a possible DL allocation even when a NB-PUSCH is in progress.

While engaged in the NB-PUSCH transmission, the UE 100 receives downlink control information (DCI) in NB-PDCCH starting in Frame N+1, subframe 0 for a NB-PDSCH transmission scheduled to begin in Frame N+3, subframe 7. The UE 100 will continue to transmit and receive NB-PUSCH and NB-PDSCH respectively starting at Frame N+3, subframe 7.

FIG. 13 shows a scenario where the UE 100 receives more than one DCI's in a single PDCCH and is informed of the scheduled NB-PUSCH and NB-PDSCH transmission. Accordingly the UE 100 starts NB-PUSCH transmission in resources Frame N+2, subframe 2 and also starts receiving NB-PDSCH from Frame N+3, subframe 7 while the UL transmission is still ongoing.

FIG. 14 depicts the scenario where the UE 100 monitors the NB-PDCCH resource during the NB-PDSCH transmission gap starting at Frame N+1, subframe 0. Further, the UE 100 can be informed about the NB-PUSCH schedule starting in Frame N+3, subframe 3 and starts the UL transmission while the DL reception is still ongoing.

TDD NB-PUSCH Numerologies

TDD NB-IoT UE(s) 100 may support numerology of 15 KHz for NB-PUSCH with subframe duration of 1 ms. Since 3.75 KHz subcarrier spacing has a subframe duration of 4 ms, supporting subframe level scheduling of NB-PUSCH transmissions is not feasible, since maximum available contiguous UL transmission duration for the present LTE configuration is only 3 ms. Therefore, this can be handled in two ways as discussed below Slot Level Transmissions Presently the transmissions can be restricted to be scheduled only at subframe boundaries. However, the existing numerologies can be reused for TDD NB-IoT by allowing the transmission scheduling at slot boundaries. The slot duration for 3.75 kHz is 2 ms. Hence, the numerology can be used for TDD configurations with contiguous UL duration length of at least 2 ms. However, 3.75 kHz spacing cannot be used in certain configurations with only 1 ms UL duration (TDD DL-UL configuration 2 and 5).

TDD NB-PUSCH Numerology

Embodiments herein define TDD numerology with sub-carrier spacing of 7.5 kHz. The subcarrier spacing will have the slot duration and subframe duration of 1 ms and 2 ms respectively. By allowing the transmission boundaries at slot levels, all the TDD configurations with 1 ms UL duration can be accommodated.

The following are the methods which can use the above two approaches:

Reuse the FDD NB-IoT numerology scheme and allow the transmission scheduling at slot boundaries. 3.75 kHz spacing is allowed only in the TDD configurations {0, 1, 3, 4, 6}.

Use UL numerologies 15 kHz and 7.5 kHz. The transmission scheduling allowed only at subframe boundaries. 7.5 kHz subcarrier spacing is allowed only in the TDD configurations {0, 1, 3, 4, 6}.

Use the UL numerologies 15 kHz and 7.5 kHz. The transmission scheduling is allowed only at the slot boundaries. 7.5 kHz subcarrier spacing is allowed in all the TDD configurations.

Table 1 summarizes the boundary restrictions for the above mentioned UL numerologies.

TABLE 1

| Number of Contiguous UL SF | Subcarrier Spacing | Transmission/ Gap start boundary unit | Transmission/ Gap start boundary unit duration(ms) |
|---|---|---|---|
| 1 | 15 | 1 SF | 1 |
|   | 7.5 | 1 Slot | 1 |
|   | 3.75 | NA | NA |
| 2 | 15 | 1 SF | 1 |
|   | 7.5 | 1 SF or 1 Slot | 2 or 1 |
|   | 3.75 | 1 Slot | 2 |
| 3 | 15 | 1 SF | 1 |
|   | 7.5 | 1 SF or 1 Slot | 2 or 1 |
|   | 3.75 | 1 Slot | 2 |

TDD and Special Subframe(S) Configurations

For in-band and guard band cases, where all or a subset of TDD and special subframes could be used, due to lower data requirements and higher repetitions in the NB-IoT, the TDD configurations with DL-UL periodicity of 10 ms, i.e., configurations 3, 4 and 5 could be preferred. Single special subframe in these configurations would help to achieve higher spectral efficiency.

TDD Configurations

Present configurations have DL-UL switching periodicities of either 5 ms of 10 ms. Due to the repetitions involved in the NB-IoT transmissions, such frequent switching periodicities are unnecessary for certain scenarios. Hence, the TDD configurations with higher switching periodicities can be defined.

FIG. 15 depicts an example with switching periodicity of 20 ms where the special subframe(s) for switching between DL-UL occurs in subframe 7 of the frame with odd system frame number (SFN). Further, the transmission of synchronization signals may be different from the FDD NB-IoT system in such configuration.

Dynamic TDD

Implementation of the dynamic TDD type systems can be considered where the subframes can be scheduled as UL or DL by the eNB and the information is conveyed to the UE 100 through a signaling mechanism. This would allow the eNB to adapt allocation of UL and DL resources based on the need. In an embodiment, the information can be sent as a 40 ms bitmap in one of the NB-IoT SIBs, similar to the way invalid subframe information is conveyed to FDD NB-IoT devices. This information can be included as part of NB-IoT SIB1.

FIG. 16 depicts an illustration of TDD DL-UL configuration through a 40 bit length map. Upon receiving the bitmap the UE 100 will be aware of the subframes in 40 ms interval used for the UL and the DL transmission. FIG. 16 also shows a method of indicating three values using single bit information. In an example shown in FIG. 16, where the UL can be indicated by setting the bit field to 0 and both the DL and special subframes are indicated by setting the bit field to 1. The bit fields, which are set to 1 followed by a bit field 0 are treated as special subframes. Upon receiving the bitmap from a NB-IoT SIB, the UE 100 can use the bit map information to determine if the subframe is UL and DL starting at frames with system frame number that is a multiple of 4.

Special Subframe Configurations

In the legacy LTE, Downlink Pilot Time Slot (DwPTS) region can be extended up to 10 LTE symbols. In the TDD NB-IoT, the region can be used for narrowband reference signal (NB-RS) transmission. As per the current agreement for the NB-IoT, the NB-RS can be transmitted in the last two symbols of every slot.

FIG. 17 depicts an example of transmission of NB-RS in special subframes for special subframe configuration 2 with DwPTS region comprising of 9 symbols. Extending the FDD NB-RS scheme, a NB-RS port 0 and port 1 signals can be transmitted in last two symbols of the DwPTS as shown in FIG. 15.

Mode Indication

The TDD/FDD mode indication can be sent through the NB-MIB, where a reserved bit of the NB-MIB can be used to indicate the mode. For example, if the bit is set, the mode of operation is FDD; else the mode of operation is TDD. FIG. 18 shows the reserved bit in 34-bit payload of the NB-MIB indicating the mode. Else, the mode can be represented in NB-SIB1 as well along with the TDD configuration.

DL and UL Gaps for TDD

UL Gaps

The gaps in uplink of the NB-IoT FDD mode can be considered for re-synchronization. However, in case of TDD, both the downlink and the uplink transmissions happen in the same frequency band. Hence, there is no need for band change for re-synchronization when the uplink is ongoing. Hence, the embodiments herein suggest that the gaps are not applicable to the UL subframes and the special subframes.

DL Gaps

Multicarrier Operation with DL Gaps

For the NB-IoT FDD, the gap period can be chosen from a set {64,128,256,512} and a gap size is chosen from a set {1/8, 1/4, 3/8, 1/2}. Therefore, the gap sizes can be found to be {8, 16, 24, 32, 48, 64, 96, 128, 192, 256}. The same gap sizes can be re-used for the NB-IoT TDD as well.

Assuming the similar gap structure for NB-IoT TDD, DL gaps can be used efficiently in multi-PRB (physical resource block) operations. In the multi-PRB operations, the gap configurations for anchor and non-anchor PRBs can be same or different. If the gap configurations are different, then there can be a chance for the UE 100 to jump to the anchor PRB in case of a DL gap in secondary PRB to acquire any system information (NB-SIB/NB-MIB).

Following are the few examples, where the UE 100 can efficiently utilize gaps on the secondary PRB and decode either NB-MIB/NB-SIB1, which are being transmitted on the anchor PRB. Consider a case where the UE 100 is configured with a gap on the secondary PRB (non-Anchor) and a NB-MIB transmission falls in that gap period on the anchor PRB. FIG. 19 describes an example, where an ongoing unicast transmission on the downlink non-anchor PRB encounters a DL gap; the UE 100 jumps to the anchor PRB to decode the NB-MIB, which is transmitted in 1st subframe of every radio frame. Further, the UE 100 comes back to the non-anchor PRB when the DL gap is finished.

Consider another case, where the UE 100 can be configured with a gap on the secondary PRB (non-Anchor) and a NB-SIB1 transmission falls in that gap period on the anchor PRB. FIG. 20 describes an example, where an ongoing unicast transmission on the downlink non-anchor PRB encounters a DL gap, the UE 100 jumps to the anchor PRB to decode NB-SIB1, which can be transmitted in one subframe of every other frame and comes back to the non-anchor PRB when the DL gap is finished.

In both the cases described above, the UE 100 can store the NB-SIB UNB-MIB information received in the gaps of the secondary PRB, so that the information can be used for combining later. For example, if the UE 100 is in the non-anchor or secondary PRB receiving a downlink data (NPDCCH/NPDSCH) and there can be an emergency of decoding the system information i.e., NB-SIB/NB-MIB, the UE 100 can discard the reception of the downlink data and the uplink transmission and further proceed to decode the NB-SIB/NB-MIB in the anchor PRB. And if there is any uplink ACK/NACK feedback that needs to be sent for previous NPDSCH transmission, the UE 100 may choose to send uplink ACK/NACK before jumping to the anchor PRB or can discard the former one and jump to the anchor PRB for decoding the required system information.

For example, consider a case where the UE 100 is receiving NPDCCH in the non-anchor PRB, then the UE 100 decodes the NB-SIB1/NB-MIB in the anchor PRB discarding the NPDCCH, corresponding NPDSCH and HARQ ACK/NACK feedback. Here, the UE 100 cannot send uplink ACK/NACK, because the UE 100 does not know the uplink resources indicated in the DCI. But the UE 100 can choose to send the ACK/NACK feedback of the previous NPDSCH transmission.

For example consider a case, where the UE 100 is receiving NPDSCH in the non-anchor PRB, then the UE 100 decodes NB-SIB1/NB-MIB in the anchor PRB discarding the NPDSCH. Here, the UE 100 can send NACK in uplink ACK/NACK feedback, if the UE completes NB-SIB1/NB-MIB decoding before the scheduled time of UL ACK/NACK feedback. Otherwise, the UE 100 can skip ACK/NACK feedback as well and continue to decode the NB-SIB1/NB-MIB in the anchor PRB.

The above mentioned examples are described in FIGS. 19 and 20, where the UE 100 is on the DL non-anchor PRB sending and receiving NPUSCH and NPDCCH/NPDCH respectively. Meanwhile, the UE 100 jumps to the anchor-PRB by discarding the ongoing transmission to decode the NB-MIB/NB-SIB1.

Scheduling Delay and Gap Configuration for TDD

When there is an ongoing unicast (NPDCCH/NPDSCH) transmission, there is a chance that the ongoing transmission is just completed and a gap occurs which is pre-configured just after that. In such cases, scheduling delay of the NPDSCH transmission with respect to the corresponding NPDCCH and the scheduling delay of NPUSCH transmission with respect to the corresponding NPDSCH can be counted in few possible ways as described below.

Scheduling Delay of NPDSCH w.r.t NPDCCH

Consider a case where the NPDCCH is just finished and a gap is starting. The NPDSCH can count the scheduling delay from the end of the NPDCCH even though the delay falls within the gap. Start the NPDSCH transmission from the end of the gap or after the scheduling delay whichever is later in time. In an embodiment herein, the scheduling delay indicated in the DCI can be counted from the end of the gap.

Further, if the UE 100 come across one or more UL subframes while counting the scheduling delay for NPDSCH. In those scenarios, the UE 100 can choose either of the following two options when the UE 100 encounters the UL subframe(s). The UE 100 can include the UL subframes while counting the scheduling delay of NPDSCH and transmit the NPDSCH in the next available DL subframe; or the UE 100 can count only valid DL subframes and transmit in the next available DL subframe.

For example, consider a DL Gap of 8 ms and scheduling delay of 12 ms for NPDSCH w.r.t NPDCCH. The LTE TDD configuration uplink-downlink configuration 1 is chosen to illustrate the cases discussed above in the following figures.

The FIGS. 23 and 24, where K represents the starting point of the scheduling delay count and K+n represents the total scheduling delay of 'n' ms while counting.

FIG. 23 depicts a scenario, where scheduling delay can be started after the gap and includes the UL subframes while counting. FIG. 24 shows the radio frame, where scheduling delay is started after the gap and excludes the UL subframes while counting.

FIG. 25 depicts a scenario, where scheduling delay is started after the NPDCCH ignoring the gap includes the UL subframes while counting and NPDSCH starts in the next available valid DL subframe after the delay. FIG. 26 depicts a radio frame, where scheduling delay is started after NPDCCH ignoring the gap and excludes the UL subframes while counting and NPDSCH starts in the next available valid DL subframe after the delay.

Scheduling Delay of NPUSCH with Respect to NPDSCH

Similar to the scenario described in the above section, there is a chance that NB-PDSCH transmission is finished just before the gap. In such cases, the embodiments herein disclose that the scheduling delay indicated in the DCI for the UL ACK/NACK feedback for the NB-PDSCH should ignore the gap configuration and count the scheduling delay from the end of corresponding NPDSCH transmission. And while counting the same, the UE 100 can choose either of the following two options when a DL subframe is encountered.

Including DL subframes while counting scheduling delay after NPDSCH for the corresponding UL ACK/NACK feedback. FIG. 27 illustrates an example for counting scheduling delay of NPUSCH including DL subframes, where the LTE TDD UL-DL configuration 1 is chosen and a scheduling delay of 16 ms is chosen for NPUSCH w.r.t NPDSCH; or Counting only valid UL subframes and transmitting in the next available UL subframe. FIG. 28 illustrates counting scheduling delay of NPUSCH excluding DL subframes where LTE TDD UL-DL configuration 1 is chosen and a scheduling delay of 16 ms is chosen for NPUSCH w. r. t NPDSCH.

If possible, UL ACK/NACK feedback for the received DL NPDSCH can be sent through the special subframe(s) in the TDD.

In an embodiment, NPDCCH/NPDSCH/NPUSCH can be scheduled for another UE 100 in a gap. In such cases, the continuity of the transmissions scheduled in the gap should be there in the upcoming gap. For example, FIG. 29 illustrates the case where there is UE1's unicast transmission is ongoing and UE2's unicast transmission is started when a DL Gap1 is encountered. Again, the UE2 unicast transmission is continued in the next DL Gap2.

Valid Subframes for UL Scheduling for TDDs

In the given TDD configuration of invalid subframes for UL/DL in NB-IoT TDD operation mode, following options can be chosen while counting the invalid subframes.

For Uplink:

Count only the UL subframes and then the next available UL subframe after the count is considered as valid for the UL transmission.

Count any (DL/UL) subframe and the next available UL subframe is considered as valid subframe for the UL transmission.

For Downlink,

Count only DL subframes and then the next available DL subframe after the count is considered as valid for the DL transmission.

Count any (DL/UL) subframe and the next available DL subframe is considered as valid subframe for the DL transmission.

Reference Signals NRS

Considering low complexity UE(s) 100 in NB-IoT, for TDD, embodiments herein suggest that the NB-RS pattern, sequence generation and the locations to be same as that of the FDD operation.

Also, instead of using 2-port transmission (Tx) diversity scheme, the embodiments herein disclose use of the single port transmission scheme by boosting the reference signals both in number and power. Further, it is possible that at low SNRs, single port signal density boosting may perform better than the Tx diversity scheme.

Hybrid Automatic Repeat Request (HARQ)

Embodiments herein disclose a second HARQ process in the downlink so that the UE 100 can monitor multiple data transmissions in interleaved fashion. The indication of HARQ process number can be done through the DCI using an extra bit or by re-using the existing bits.

For two HARQ processes, DCIs can be different. Therefore, network can choose to send both the DCIs in same NPDCCH or it can be sent in two different NPDCCH.

Transmission of two HARQ processes should be in such a way that the resources are used efficiently. And there can be many possibilities to do so. Embodiments herein present two such cases where the eNB handles two HARQ processes. The first one includes DCIs of both HARQ processes are sent separately and the other one includes two DCIs sent in same NPDCCH.

Figures 30B, 31A:
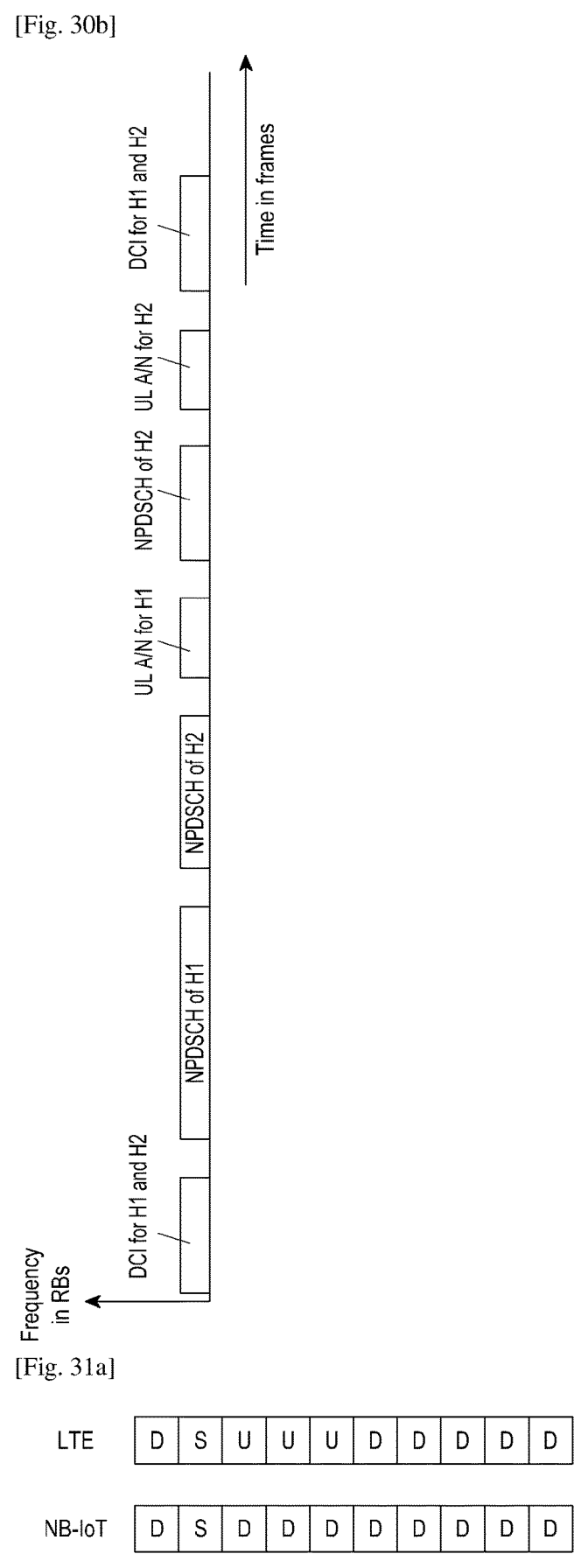

FIGS. 30*a* and 30*b* illustrate the two different scenarios where two HARQ processes are maintained.

In FIG. 30*a*, network sends the NPDCCH (DCI) and NPDSCH of 1st HARQ Process (H1), and then NPDCCH (DCI) for 2nd HARQ Process (H2) is sent. And then uplink ACK/NACK feedback for H1 is sent by the UE 100 to the network. Following this, the network sends NPDSCH for H2 and DCI for H1. Then, the UE 100 sends ACK/NACK feedback for H2. FIG. 30*a* illustrates the case where the network starts sending the DCI of another HARQ process after sending the data of other HARQ process, but before the ACK/NACK feedback of the previous transmission.

FIG. 30*b* illustrates DCI for both H1 and H2 are received in same NPDCCH. The NPDSCH for H1 follows this. Then the NPDSCH of H2 is sent partially. After that, UL ACK/NACK feedback for H1 is sent. Once this is done, remaining NPDSCH of H2 is sent and then UL ACK/NACK of H2 can be sent to the network. FIG. 30*b* further illustrates the case where the network starts sending the partial data of another HARQ process immediately after the current HARQ data transmission. And the rest of the data is sent once the ACK/NACK feedback of previous data is sent. Similar to the above cases, there can be other ways of sending two HARQ processes as per the network and The UE 100 convenience.

Usability of UL Subframes for DL Transmission

Given that the UL scheduling is controlled by the eNB, it should be possible to use some of the UL subframes as indicated in TDD configuration for downlink. This is required in cases where there is a need of decoding some important downlink information, which has a large number of repetitions.

And such UL over-riding should be mentioned or signaled to the UE 100 through DCI/SIB or it can be made periodic. FIGS. 31*a* and 31*b* shows the assignment of the UL subframe to the DL subframe in uplink-downlink LTE TDD configurations 3 and 6 for NB-IoT.

Multi-PRB Operation

As TDD is synchronized, it is suggested that multi-PRB operation should be possible even when the donor cell IDs of the PRBs are different. Embodiments herein suggest that the donor cell information can be indicated in NB-SIB1. And for multi-PRB operation with two different donor cells, NB-SIB1 can contain a bit which indicates the status of donor cells being same or different. Also, the NB-SIB1 itself can contain other donor cell information, if different donor cells are chosen for multi-PRB operation.

For example, FIG. 32 illustrates a case, where the UE 100 hops between two PRBs one in Donor, region with cell ID A and the other in Donor2 region with cell ID B.

The embodiments disclosed herein can be implemented through at least one software program running on at least one hardware device and performing network management functions to control the elements. The elements shown in FIG. 1 can be at least one of a hardware device, or a combination of hardware device and software module.

FIG. 33 is a diagram illustrating a configuration of a base station according to various embodiments of the present disclosure.

From the perspective of the first embodiment, the operations of a base station will be followings. The base station includes a transceiver unit 3301, a processor 3303.

The transceiver 3301 may be comprises transmitter and receiver. The transceiver 3301 includes an RF unit to execute the transmission and reception of a signal with a UE according to the present disclosure.

The processor 3303 controls operations of the UE according to the present disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

The invention claimed is:

1. A method of a user equipment (UE) in a wireless communication system supporting time division duplex (TDD), the method comprising:

receiving a system information block for narrowband Internet of Things (NB-IoT) including a bitmap for specifying NB-IoT downlink (DL) subframes for downlink transmission;

identifying a plurality of NB-IoT DL subframes indicated by the bitmap in the system information block;

obtaining first DL control information (DCI) for a first hybrid automatic repeat request (HARQ) process and second DCI for a second HARQ process by monitoring a narrowband physical downlink control channel (NPDCCH) on the plurality of NB-IoT DL subframes; and receiving first DL data for the first HARQ process based on the first DCI, and receiving second DL data for the second HARQ process based on the second DO, wherein the receiving of the first DL data comprises identifying a first NB-IoT DL subframe in which the NPDCCH with the first DCI ends, and receiving the first DL data after a predetermined number of NB-IoT DL subframes from among NB-IoT downlink and uplink subframes subsequent to the first NB-IoT DL subframe included in the plurality of NB-IoT DL subframes, and wherein the receiving of the second DL data comprises identifying a second NB-IoT DL subframe in which the NPDCCH with the second DCI ends, and receiving the second DL data after a predetermined number of NB-IoT DL subframes from among the NC-IoT downlink and uplink subframes subsequent to second NB-IoT DL subframe included in the plurality of NB-IoT DL subframes.

2. The method of claim 1, wherein the first DCI includes a 1-bit field indicating a first HARQ process number to indicate the first HARQ process, and the 1-bit field indicating the second DCI includes a second HARQ process number to indicate the second HARQ process.

3. The method of claim 1, wherein the obtaining of the first DCI and the second DCI comprises:

obtaining the first DCI on a first NB-IoT DL subframe in the plurality of NB-IoT DL subframes, and obtaining the second DCI on a second NB-IoT DL subframe in the plurality of NB-IoT DL subframes, and wherein the first NB-IoT DL subframe is different from the second NB-IoT DL subframe.

4. The method of claim 1, wherein the obtaining of the first DCI and the second DCI comprises:

obtaining the first DCI and the second DCI on a same NB-IoT DL subframe included in the plurality of NB-IoT DL subframes.

5. A method of a base station (BS) in a wireless communication system supporting time division duplex (TDD), the method comprising:

transmitting, to a user equipment (UE), a system information block for narrowband Internet of Things (NB-IoT) including a bitmap for specifying NB-IoT downlink (DL) subframes for downlink transmission;

transmitting, to the UE, first DL control information (DCI) for a first hybrid automatic repeat request (HARQ) process and second DCI for a second HARQ process through a narrowband physical downlink control channel (NPDCCH) on the plurality of NB-IoT DL subframes; and transmitting, to the UE, first DL data for the first HARQ process based on the first DCI, and transmitting, to the UE, second DL data for the second HARQ process based on the second DCI, wherein the transmitting of the first DL data comprises identifying a first NB-IoT DL subframe in which the NPDCCH with the first DCI ends, and transmitting, to the UE, the first DL data after a predetermined number of NB-IoT DL subframes from among NB-IoT downlink and uplink subframes subsequent to the first NB-IoT DL subframe included in the plurality of NB-IoT DL subframes, and wherein the transmitting of the second DL data comprises identifying a second NB-IoT DL subframe in which the NPDCCH with the second DCI ends, and transmitting, to the UE, the second DL data after a predetermined number of NB-IoT DL subframes from among NB-IoT downlink and uplink subframes subsequent to the second NB-IoT DL subframe included in the plurality of NB-IoT DL subframes.

6. The method of claim 5, wherein the first DCI includes a 1-bit field indicating a first HARQ process number to indicate the first HARQ process, and the second DCI includes a 1-bit field indicating a second HARQ process number to indicate the second HARQ process.

7. The method of claim 5, wherein the transmitting of the first DCI and the second DCI comprises:

transmitting, to the UE, the first DCI on a first NB-IoT DL subframe in the plurality of NB-IoT DL subframes, and transmitting, to the UE, the second DCI on a second NB-IoT DL subframe in the plurality of NB-IoT DL subframes, and wherein the first NB-IoT DL subframe is different from the second NB-IoT DL subframe.

8. The method of claim 5, wherein the transmitting of the first DCI and the second DCI comprises:

transmitting, to the UE, the first DCI and the second DCI on a same NB-IoT DL subframe included in the plurality of NB-IoT DL subframes.

9. A user equipment (UE) in a wireless communication system supporting time division duplex (TDD), the UE comprising:

a transceiver; and at least one processor configured to:

control the transceiver to receive a system information block for narrowband Internet of Things (NB-IoT) including a bitmap for specifying NB-IoT downlink (DL) subframes for downlink transmission, identify a plurality of NB-IoT DL subframes indicated by the bitmap in the system information block, obtain first DL control information (DCI) for a first hybrid automatic repeat request (HARQ) process and second DCI for a second HARQ process by monitoring a narrowband physical downlink control channel (NPDCCH) on the plurality of NB-IoT DL subframes, and control the transceiver to receive first DL data for the first HARQ process based on the first DCI, and receive second DL data for the second HARQ process based on the second DCI, wherein the at least one processor is further configured to:

identify a first NB-IoT DL subframe in which the NPDCCH with the first DCI ends, control the transceiver to receive the first DL data after a predetermined number of NB-IoT DL subframes from among NB-IoT downlink and uplink subframes subsequent to the first NB-IoT DL subframe included in the plurality of NB-IoT DL subframes, identify a second NB-IoT DL subframe in which the NPDCCH with the second DCI ends, and control the transceiver to receive the second DL data after a predetermined number of NB-IoT DL subframes from among NB-IoT downlink and uplink subframes subsequent to the second NB-IoT DL subframe included in the plurality of NB-IoT DL subframes.

10. The UE of claim 9, wherein the first DCI includes a 1-bit field indicating a first HARQ process number to indicate the first HARQ process, and the 1-bit field indicating the second DCI includes a second HARQ process number to indicate the second HARQ process.

11. The UE of claim 9, wherein the at least one processor is further configured to obtain the first DCI on a first NB-IoT DL subframe in the plurality of NB-IoT DL subframes, and obtaining the second DCI on a second NB-IoT DL subframe in the plurality of NB-IoT DL subframes, and wherein the first NB-IoT DL subframe is different from the second NB-IoT DL subframe.

12. The UE of claim 9, wherein the at least one processor is further configured to obtain the first DCI and the second DCI on a same NB-IoT DL subframe included in the plurality of NB-IoT DL subframes.

13. A base station (BS) in a wireless communication system supporting time division duplex (TDD), the BS comprising:
- a transceiver; and
- at least one processor configured to control the transceiver to:
- transmit, to a user equipment (UE), a system information block for narrowband Internet of Things (NB-IoT) including a bitmap for specifying NB-IoT downlink (DL) subframes for downlink transmission,
- transmit, to the UE, first DL control information (DCI) for a first hybrid automatic repeat request (HARQ) process and second DCI for a second HARQ process through a narrowband physical downlink control channel (NPDCCH) on the plurality of NB-IoT DL subframes, and
- transmit, to the UE, first DL data for the first HARQ process based on the first DCI, and transmit, to the UE, second DL data for the second HARQ process based on the second DCI,
- wherein the at least one processor is further configured to control the transceiver to:
- identify a first NB-IoT DL subframe in which the NPDCCH with the first DCI ends,
- control the transceiver to transmit, to the UE, the first DL data after a predetermined number of NB-IoT DL subframes from among NB-IoT downlink and uplink subframes subsequent to the first NB-IoT DL subframe included in the plurality of NB-IoT DL subframes,
- identify a second NB-IoT DL subframe in which the NPDCCH with the second DCI ends, and
- control the transceiver to transmit, to the UE, the second DL data after a predetermined number of NB-IoT DL subframes from among NB-IoT downlink and uplink subframes subsequent to the second NB-IoT DL subframe included in the plurality of NB-IoT DL subframes.

14. The BS of claim 13, wherein the first DCI includes a 1-bit field indicating a first HARQ process number to indicate the first HARQ process, and the second DCI includes a 1-bit field indicating a second HARQ process number to indicate the second HARQ process.

15. The BS of claim 13, wherein the at least one processor is further configured to control the transceiver to transmit, to the UE, the first DCI on a first NB-IoT DL subframe in the plurality of NB-IoT DL subframes, and transmitting, to the UE, the second DCI on a second NB-IoT DL subframe in the plurality of NB-IoT DL subframes, and
wherein the first NB-IoT DL subframe is different from the second NB-IoT DL subframe.

16. The BS of claim 13, the at least one processor is further configured to control the transceiver to transmit, to the UE, the first DCI and the second DCI on a same NB-IoT DL subframe included in the plurality of NB-IoT DL subframes.

* * * * *